WILLIAM H. BROWN.

Baggage Truck.

No. 121,928.          Patented Dec. 19, 1871.

Witnesses.
S. N. Piper.
L. N. Miller.

William H. Brown.
by his attorney.
R. H. Eddy

UNITED STATES PATENT OFFICE.

WILLIAM HAMMOND BROWN, OF BANGOR, MAINE.

IMPROVEMENT IN BAGGAGE-TRUCKS.

Specification forming part of Letters Patent No. 121,928, dated December 19, 1871.

*To all whom it may concern:*

Be it known that I, WILLIAM HAMMOND BROWN, of Bangor, of the county of Penobscot and State of Maine, have invented a new and useful or Improved Baggage-Truck; and do hereby declare the same to be fully described in this my specification and represented in the accompanying drawing making part thereof, of which—

Figure 1:
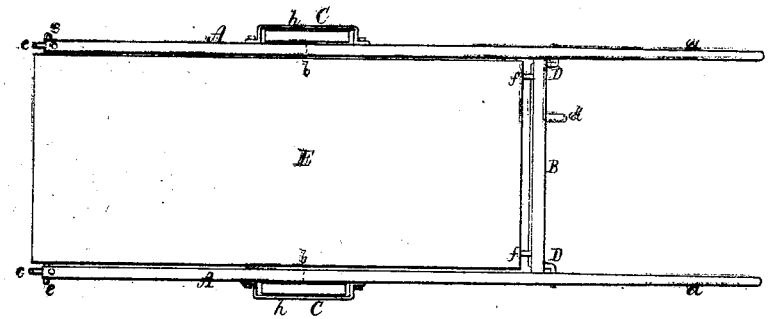
Figure 2:
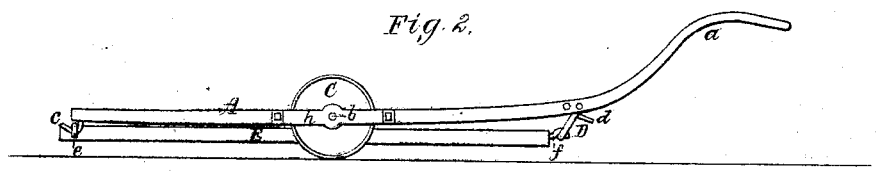
Figure 3:
Figure 5:
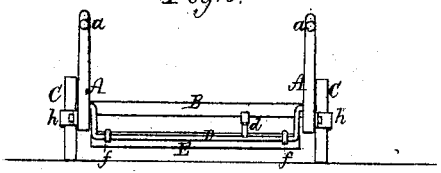
Figure 4:
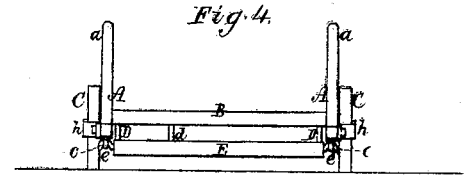

Figure 1 is a top view; Fig. 2, a side elevation; Fig. 3, a longitudinal section; Fig. 4, a rear-end view; and Fig. 5, a front-end elevation of it.

This truck contains a principle incident to the baggage-truck described in Letters Patent No. 111,104, dated January 24, 1871, and granted to me. With my present invention I wholly dispense with the arched bars of the carriage of the said patented truck, and I supply a two-wheel instead of a four-wheel truck, the said two-wheel truck being so constructed as to serve itself as a means or lever for seizing the platform at each end and lifting it off the ground. In this respect it differs materially from any other truck, and, besides, is very much simpler and better adapted for use in railway stations or in warehouses, or various other places.

In the drawing, A A denote two shafts or bars provided with curved handles *a a* and arranged at a suitable distance apart parallel to each other, and connected at or near the bases of the handles by a cross-bar or rung, B. To each of the said bars, midway between its rear end and the said bar B, there is applied a wheel, C, to revolve on an axle or arbor, *b*, projecting outward from the bar, and supported by a loop or bracket, *h*, formed and arranged with the wheel and bar, as shown, and fastened to the latter. At its rear end, or in close proximity thereto, each bar is provided with a hook, *c*, extended from it in manner as shown. A pendulous bar or lifter, D, formed as shown, is pivoted to the two bars or shafts A A in front of the cross-bar B, and is or may be provided with a bent arm or foot-piece, *d*, all being arranged and formed as represented. The platform E has two hooks, *e e*, extended from its sides near its rear corners; and it also has two such hooks, *f f*, projecting from it at its front end, all being as shown.

If, now, we suppose such a platform, while resting on the ground or the floor of a railway station, or that of a warehouse, to be laden with baggage or merchandise, and it is desirable to transport the platform and load to some other position: to accomplish this, we should run the two-wheel lever-truck up to the platform so as to receive the latter in the space between the wheels and to carry the end hooks of the shafts underneath the rear hooks of the platform. Next, the handles of the carriage or truck should be depressed so as to cause the shafts to raise the platform at its rear end off the ground sufficiently for the lifter-bar D to be forced by the attendant's foot (placed on the foot-piece *d*) underneath the front hooks of the platform. Next, by raising the handles *a* little, so as to bring the platform horizontal, it, with its load, will be raised off the ground and supported by the truck, by which it may next be moved to the required spot, where the platform may be readily disengaged from the carriage or truck to enable the latter to be moved back to its first position, or to some other, for reception of another such platform with its load.

I herein make no claim to the combination of platform, carriage, and lifting mechanism, constructed and arranged as represented in my Patent No. 111,104, as hereinbefore mentioned.

I claim—

The platform-supporter or two-wheel truck composed of the connection levers or shafts A A, the wheels C C, hooks *c c*, and pendulous lifter D, arranged in manner and to operate substantially as described, with a platform provided with hooks to project from it, in manner as shown.

WILLIAM HAMMOND BROWN.

Witnesses:
R. H. EDDY,
J. R. SNOW.

(31)